United States Patent
Muller

[15] 3,640,173
[45] Feb. 8, 1972

[54] FASTENER MEANS

[72] Inventor: Curt G. Muller, 16265 Lockerbie, Birmingham, Mich. 48009

[22] Filed: Sept. 18, 1969

[21] Appl. No.: 859,046

[52] U.S. Cl. ................................................85/8.8, 85/5 P
[51] Int. Cl. .........................................................F16b 21/06
[58] Field of Search ..............85/8.8, 8.6, 7, 1 F, 5 P, DIG. 4; 24/221 A

[56] References Cited

UNITED STATES PATENTS

| 359,394 | 3/1887 | Jones et al. | 85/1 F |
| 491,469 | 2/1893 | Carver | 85/8.8 |
| 690,335 | 12/1901 | Wesley | 85/1 F |
| 1,820,925 | 9/1931 | Toncray | 85/8.8 |
| 2,203,397 | 6/1940 | Taylor | 85/8.8 |
| 2,353,933 | 7/1944 | Schneider | 85/8.8 |
| 2,283,526 | 5/1942 | Albin | 24/221 A |
| 2,311,592 | 2/1943 | Hapanowicz | 24/221 A |
| 3,009,381 | 11/1961 | Rapata | 85/7 |

FOREIGN PATENTS OR APPLICATIONS

| 797,380 | 7/1958 | Great Britain | 85/DIG. 2 |

Primary Examiner—Edward C. Allen
Attorney—Dale A. Winnie

[57] ABSTRACT

A generally flat bolt member, having an abutment end effective for engaging one of at least two structural members to be assembled, has a head end provided for engaging a compressible retainer member situated against the opposite surface of another of the structural members; the retainer and head portion are provided with recess means and abutment means cooperatively engageable so as to collectively define disengageable detent means effective for locking the bolt and retainer in assembled relationship.

4 Claims, 11 Drawing Figures

PATENTED FEB 8 1972 3,640,173
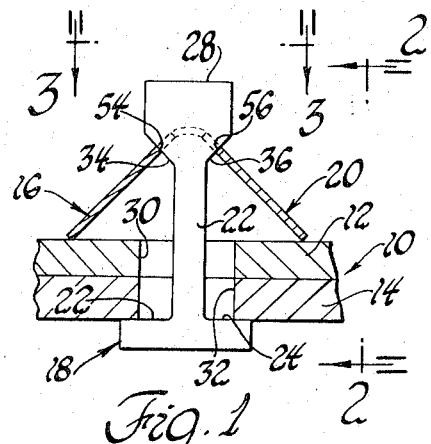
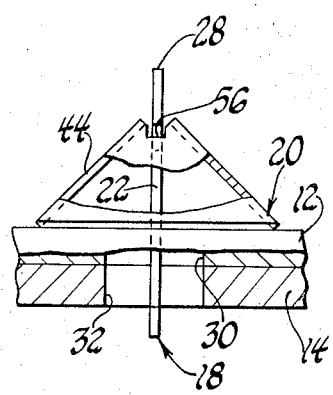
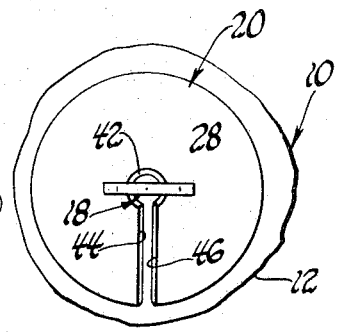
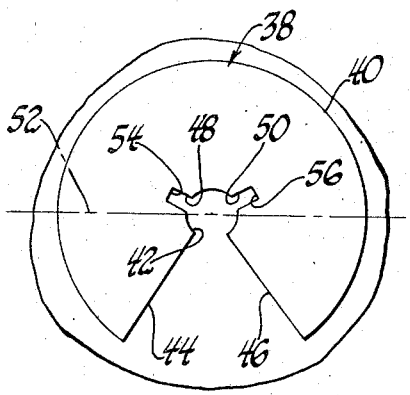
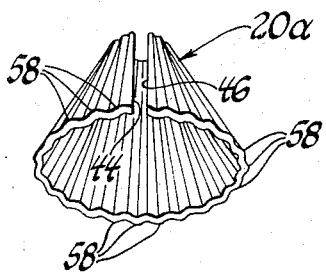
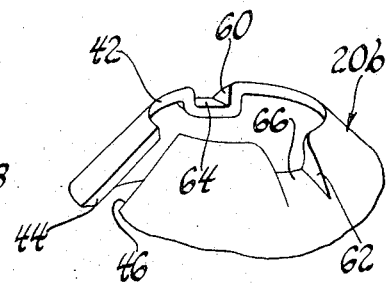
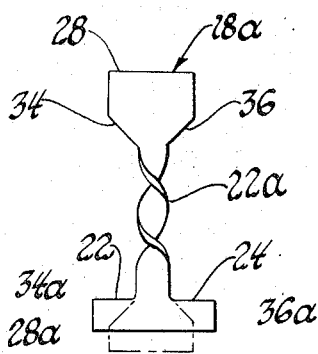
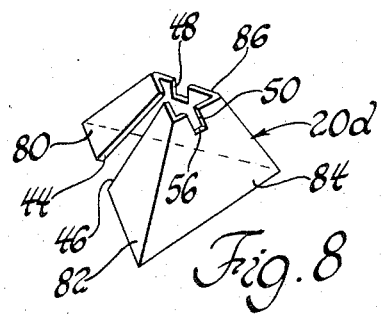
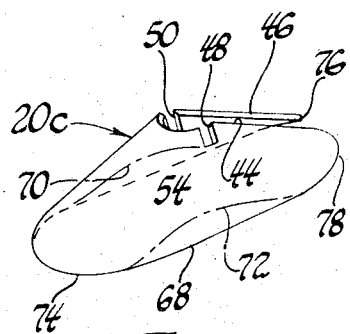
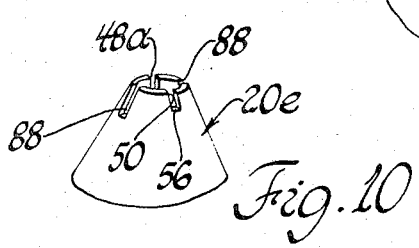
INVENTOR.
Curt G. Muller
BY
Dale A. Winnie
ATTORNEYS 3,640,173

FASTENER MEANS

BACKGROUND OF THE INVENTION

Many developments and improvements have been made in the art of fasteners and fastening arrangements; however, there still remains a need for a fastener arrangement which is capable of being quickly engaged or disengaged from the members to be joined thereby. Many forms of fasteners have been proposed; however such prior art fasteners inherently have one or more disadvantages associated therewith. For example, many prior art fasteners depend upon threaded engagement for their holding power. Such fasteners are comparatively costly and do require some time factor for effecting the rotation required to accomplish the fastening function. Further, the threaded portion is often susceptible to damage which, when it occurs, renders the threaded fastener further useless.

Further developments in the art of fasteners included various forms of clips. However, such clips often experience failing fractures when relatively slightly stressed thereby not only rendering such clips useless for further applications but also often causing failure of the assembly which the clip was intended to hold.

Accordingly, the invention as herein disclosed and claimed is directed to the solution of the above as well as other related problems.

SUMMARY OF THE INVENTION

According to the invention, a fastener device for maintaining two or more structural members in assembled relationship, comprises a bolt, said bolt having first and second ends and an intermediate shank portion joining said ends, said bolt being adapted to be received through a clearance opening formed through said structural members so as to have said first end disposed on one side of said structural members and constrained against movement in a direction toward said second end disposed on the other side of said structural members, a retainer adapted to be situated generally between said other side of said structural member and said second end of said bolt and generally circumscribing said shank portion, and detent means for enabling said second end of said bolt to be disengageably locked to said retainer, said retainer being effective to undergo compression between said second end of said bolt and said other side of said structural members in order to thereby produce a compressive force against said structural members maintaining said structural members in assembled relationship.

Accordingly, a general object of the invention is to provide a fastener device as set forth above which can be quickly engaged and disengaged but which has inherent means for precluding disengagement resulting from such external forces such as induced vibrations.

Another object of the invention is to provide a fastener device as set forth above which has the ability of providing a variable holding force when fully assembled against the structural members.

A further object of the invention is to provide a fastener device which requires no special tools in order to effect the engagement or disengagement of the elements comprising the fastener device.

Other more specific objects and advantages of the invention will become apparent when reference is made to the following detailed description considered in conjunction with the accompanying drawings.

DESCRIPTION OF THE DRAWINGS

In the drawings, wherein certain elements or details, for purposes of clarity, may be omitted from one or more views:

FIG. 1 is a cross-sectional view of a fastener means, constructed in accordance with the teachings of the invention, holding two related structural members in assembled relationship;

FIG. 2 is a side elevational view of the fastener means, taken generally on the plane of line 2—2 of FIG. 1, with portions thereof broken away and crosshatched;

FIG. 3 is a top plan view of the fastener means taken generally on the plane of line 3—3 of FIG. 1 and looking in the direction of the arrows;

FIG. 4 is a plan view illustrating a blank form which may be employed in the fabrication of a retainer in accordance with the invention;

FIG. 5 is a perspective view of a first modification of the invention;

FIG. 6 is an enlarged perspective view fragmentarily illustrating a second modification of the invention;

FIGS. 7, 8 and 10 respectively illustrate, in perspective, second, third and fourth embodiments of the invention;

FIG. 9 illustrates in elevation a modified form or forms of the bolt member shown in FIG. 1; and FIG. 11 is an enlarged fragmentary cross-sectional view illustrating a third modification of the invention.

DESCRIPTION OF THE PREFERRED EMBODIMENTS

Referring now in greater detail to the drawings, FIG. 1 fragmentarily illustrates a structural assembly 10 comprised of members 12 and 14 which are secured to each other by fastener means 16 constructed in accordance with the teachings of the invention. As illustrated in both FIGS. 1 and 2, the fastener means 16 comprises a drawbarlike bolt 18 coacting with a retainer 20 so as to compressively engage the structural members 12 and 14 to each other. In the preferred embodiment, bolt 18 is formed to have a shank portion 22 provided with, at one end, abutment arms 24 and 26 and, at the other end, a locking head 28. The width of the head 28 is, of course, of such dimension as to be freely accommodated by the aligned apertures 30 and 32 respectively formed in structural members 12 and 14. In viewing FIG. 2, it becomes apparent that the apertures 30 and 32 need not be circular as illustrated but may well be of a slotlike configuration closely accommodating the comparative slight thickness of bolt member 18. As best seen in FIG. 1, the head end 28 is enlarged, in comparison to the shank portion 22, so as to thereby provide oppositely disposed abutment portions 34 and 36 which coact with suitable detent means formed in the retainer 20 in order to maintain bolt 18 and retainer 20 in locked relationship and thereby assure the continued assembly of members 12 and 14.

The retainer 20 illustrated in FIGS. 1, 2 and 3 as being generally conical, may in fact be formed from flat sheet or strip stock metallic material. For example, referring to FIG. 4, an initial flat blank 38 could have a circular or arcuate outer periphery 40 and a generally circular centrally disposed aperture 42. A wedge-shaped portion of the body of blank 38 may be cut away so as to define radially extending edges 44 and 46 each extending from aperture 42 to outer periphery 40. Further, as also illustrated in FIG. 4, a plurality of notches 48 and 50 are also cut into the blank body in a manner as to be generally oppositely disposed about aperture 42 and slightly upwardly inclined from the horizontal line 52 of FIG. 4. Once the blank 38 is thusly formed, it can be generally curled into a conical configuration whereby the edges 44 and 46 are brought into relatively close proximity to each other as shown, for example, in FIG. 3.

As may be evident in view of the above, the fastener means of the invention can be assembled by, for example, first inserting the bolt member 18 through the apertures 30 and 32 of members 12 and 14 so as to thereby abuttingly engage the arm portions 22 and 24 against member 14 and have head portion 28 extending beyond panel or member 12. Next, the retainer 20 is placed against member 12 and moved toward the projecting portion of bolt 18 in a direction so as to have the bolt 18 pass, edgewise, through the slot in retainer 20 defined by juxtaposed edges 44 and 46. When the projecting portion of bolt 18 is generally received within the confines of inner aperture 42, the retainer 20 and bolt 18 are rotated 90° relative to each other thereby causing the oppositely disposed abutment portions 34 and 36 to be respectively received within slots 48 and 50. Of course, such relative rotation of bolt 18 and retainer 20 can be accomplished in varying manners; however, such can be easily effected if, for example, the bolt 18 is permitted to remain stationary while the retainer 20 is rotated relative thereto.

In any event as the fastener elements experience such relative rotation the bolt 18 and retainer 20 undergo axially directed forces causing axial compression of the conical retainer 20 and axial tension in bolt 18. Therefore, when the oppositely disposed portions 34 and 36 are finally received within slots 48 and 50, the inclined abutment portions 34 and 36 abutably engage the closed ends 54 and 56 of slots 48 and 50, respectively, thereby functioning to maintain a degree of compression in retainer 20 and a corresponding degree of tension in bolt 18 which serves to maintain members 12 and 14 in assembled relationship.

Various modifications of the invention are contemplated. For example, if desired, the retainer 20 may be formed so as to provide indentations which serve as stiffening means for the body portion of the retainer. One particular embodiment of such a modification is illustrated in FIG. 5 wherein the body of a retainer 20a is depicted as being formed to provide a plurality of radiating riblike portions 58 which produce a corrugatedlike surface or configuration to the retainer 20a. Such a modification may prove especially beneficial where it is desired that retainer 20a be formed from relatively thin material in which case it might be desirable to increase the rigidity of the material without increasing its thickness. In FIG. 5, as well as other FIGS. illustrating other embodiments and modifications of the invention, elements which are like or similar to those of FIGS. 1-4 are identified with like reference numbers.

FIG. 6 illustrates another modification of the invention. In this embodiment, the body of a retainer 20b is formed to provide indentations 60 and 62 instead of open ended slots as shown at 48 and 50 of the preceding Figures. Such indentations or recesses 60 and 62, of course, provide the same function as do slots 48 and 50; that is, when assembled to the bolt 18, the abutment portions 34 and 36 are respectively received within recesses 60 and 62 so as to abutably engage the lower surfaces or portions 64 and 66 therein.

FIGS. 7 and 8 respectively illustrate further modified retainers 20c and 20d. For example, retainer 20c is of a somewhat oblong at its base end 68 and tapers inwardly as it progresses upwardly to the aperture 42. Further, retainer 20c also illustrates the fact that, if desired, the base end 68 may be contoured, as by providing cutout portions as indicated in phantom lines at 70 and 72 so as to either conform to a surface of like configuration on the member 12 or to provide generally three points of contact as at 74, 76 and 78.

The retainer 20d of FIG. 8 is shown merely to further illustrate the fact that, according to the invention, the retainer may take the form of a polygon having generally flat walls 80, 82, 84 and 86.

FIG. 9 illustrates a modified bolt 18a. In comparing bolt 18a to bolt 18 of FIG. 1, it can be seen that the shank portion 22a thereof is of a twisted configuration. Such a twisted shank portion is provided primarily to enhance the inherent relative elasticity of the bolt 22a. That is, when engaged with the cooperating retainer, whether such retainer be of the configuration shown at FIGS. 1, 2, 5, 6, 7 or 8, the compressive forces induced in the retainer would cause the shank 22a of experience tension and tend to unwind thereby imparting a quality of elasticity to such bolt 18a.

In addition to the above, FIG. 9 also indicates, in phantom line, a further modification. That is, the invention also contemplates the possibility of forming both ends of the bolt so as to have similar head portions 28 and 28a. This arrangement would be especially beneficial where, for example, the structural members 12 and 14 had a retainer, as indicated at 20, disposed on either side of the assembly and the bolt would be merely extending through the clearance aperture within the structural members but engaging at opposite head ends, the two retainers. In such case, of course, the abutment portions 34a and 36a would provide the same functions as 34 and 36 of head portion 28.

The various embodiments of the retainer have all been disclosed as being formed in a manner providing a slit defined by separated juxtaposed surfaces or edges 44 and 46; however, it is conceivable that the retainer may be formed in a manner whereby no such disjoining slit is provided as illustrated, for example, by the retainer 20e of FIG. 10. In this embodiment, retainer 20e includes an elongated cutout slot 88 (or opposed slots) of an effective length which is sufficient to permit the insertion therethrough, axially of the retainer 20e, of the head portion of the cooperating bolt. Such a retainer 20e may be of material benefit when combined with a bolt such as 18a, including a twisted shank 22a, in order to increase the rigidity of the retainer and correspondingly increase the elastic deformation of bolt 18a.

FIG. 11 illustrates, in enlarged fragmentary view, another modification of the retainer which can be applied to or employed in conjunction with any of the previously disclosed embodiments. As shown by retainer 20f, it is contemplated that during the process of forming the detent slots or indentations, a portion thereof can be cut and curled or bent as generally depicted at 90. The purpose of such a bent tablike portion would be to engage the bolt abutment surface, such as 36, and provide some degree of deflection or resilience within itself.

The invention as herein disclosed and described provides numerous benefits and advantages. First, it is of course apparent that the fastener means need not be formed of metal but may in fact be molded of plastic or fabricated of any other suitable material. Further, unlike prior art fastener arrangements, there is no danger of the fastener means of the invention becoming loosened because of such factors as induced vibrations. Also, as should be apparent, the engagement and disengagement of the elements comprising the fastener means is substantially instantaneous; that is, there is no time requirement for the progressive turning as is required with, for example, threaded fastener components and, although appropriate tool-engaging surfaces may be provided, there is no inherent need for the employment of any special tools in order to effect either engagement or disengagement of the components comprising the invention.

Another important benefit of the invention, not directly associated with its operation, is the fact that shipping and handling costs of such components are extremely minimal. That is, because of the relatively thin nature of the bolt element, such bolts can be stacked on their sides for shipment while the retainers can be nested within each other and thereby dramatically reduce the necessary space required for shipping purposes.

In this connection, it should be mentioned that the invention also provides another very important benefit, that being the ability to selectively vary the holding force of the fastener assembly 16. This can be accomplished, for example, by employing two or more nested retainers which are operatively engaged by a single bolt contacting the uppermost retainer in the manner generally depicted by FIG. 1.

Even through only a select number of embodiments and modifications of the invention have been disclosed and described, it is apparent that various other embodiments and modifications of the invention, such as, for example, crimping or fluting of the bolt 18 or arms and shank thereof, are possible within the scope of the invention as defined by the appended claims.

I claim:

1. A fastener device for maintaining two or more structural members in assembled relationship, said fastener device comprising a bolt, said bolt having first and second ends and an intermediate shank portion joining said ends, said bolt being adapted to be received through a clearance opening formed through said structural members so as to have said first end disposed on one side of said structural members and constrained against movement in a direction toward said second end disposed on the other side of said structural members, a retainer adapted to be situated generally between said other side of said structural members and said second end of said bolt and generally circumscribing said shank portion, said retainer including a body being formed of generally flat stock material and formed into a generally frustumlike configuration as to have a longitudinal axis generally parallel to said shank portion, said retainer body including a first relatively small open end for receiving said shank portion therethrough and for engaging said second end of said bolt and a second opposed relatively large open end for operatively abuttingly engaging said other side of said structural members, said retainer body including a slitlike opening formed through said body and extending from said first relatively small open end to said second relatively large open end, said slitlike opening enabling said retainer body to be effective to undergo compressive deformation between said second end of said bolt and said other side of said structural members in order to thereby produce a compressive force against said structural members maintaining said structural members in assembled relationship, and detent means formed on said second end of said bolt and in said retainer body about said first relatively small open end for enabling said second end of said bolt to be disengageably locked to said retainer body, said detent means comprising inclined abutment surfaces formed on the shank portion side of said second end of said bolt, and recess means formed in said retainer body, said recess means being effective to receive said abutment surfaces therein in order to thereby simultaneously induce axial tension within said bolt while longitudinally compressing said retainer body and expanding said second relatively large open end of said retainer body and to preclude relative rotation between said retainer body and said bolt, said retainer body including rigidity-increasing means formed in said body generally between said first and second ends of said body, said rigidity-increasing means comprising a plurality of riblike convolutions formed in said body in a manner as to be generally tapering toward each other as said convolutions approach said first open end.

2. A fastener device for maintaining two or more structural members in assembled relationship, said fastener device comprising a bolt, said bolt having first and second ends and an intermediate shank portion joining said ends, said bolt being adapted to be received through a clearance opening formed through said structural members so as to have said first end disposed on one side of said structural members and constrained against movement in a direction toward said second end disposed on the other side of said structural members, a retainer adapted to be situated generally between said other side of said structural members and said second end of said bolt and generally circumscribing said shank portion, said retainer including a body being formed of generally flat stock material and formed into a generally frustumlike configuration as to have a longitudinal axis generally parallel to said shank portion, said retainer body including a first relatively small open end for receiving said shank portion therethrough and for engaging said second end of said bolt and a second opposed relatively large open end for operatively abuttingly engaging said other side of said structural members, said retainer body including a slitlike opening formed through said body and extending from said first relatively small open end to said second relatively large open end, said slitlike opening enabling said retainer body to be effective to undergo compressive deformation between said second end of said bolt and said other side of said structural members in order to thereby produce a compressive force against said structural members maintaining said structural members in assembled relationship, and detent means formed in said retainer body about said first relatively small open end for enabling said second end of said bolt to be disengageably locked to said retainer body, said first and second ends and said shank portion of said bolt being of generally flat configuration, and at least said second end having oppositely disposed abutment surfaces each inclines with respect to the longitudinal axis of said bolt so as to be generally diverging from each other, said abutment surfaces being adapted to be received within said detent means formed in said retainer body in order to thereby apply compressive forces against said retainer body.

3. A fastener device according to claim 2, wherein at least said shank portion is generally axially twisted providing for increased elasticity between said first and second ends of said bolt.

4. A fastener device according to claim 2, wherein said detent means formed in said retainer body comprises a plurality of recess formed as to have open ends terminating in said first relatively small open ends, and wherein each of said recesses includes a closed end defining respective second abutment surfaces, said second abutment surfaces being in themselves resiliently deformable upon engagement with said first mentioned abutment surfaces.

* * * * *